Sept. 22, 1936.  E. E. HEWITT  2,055,106
ELECTROPNEUMATIC BRAKE
Filed Oct. 10, 1934
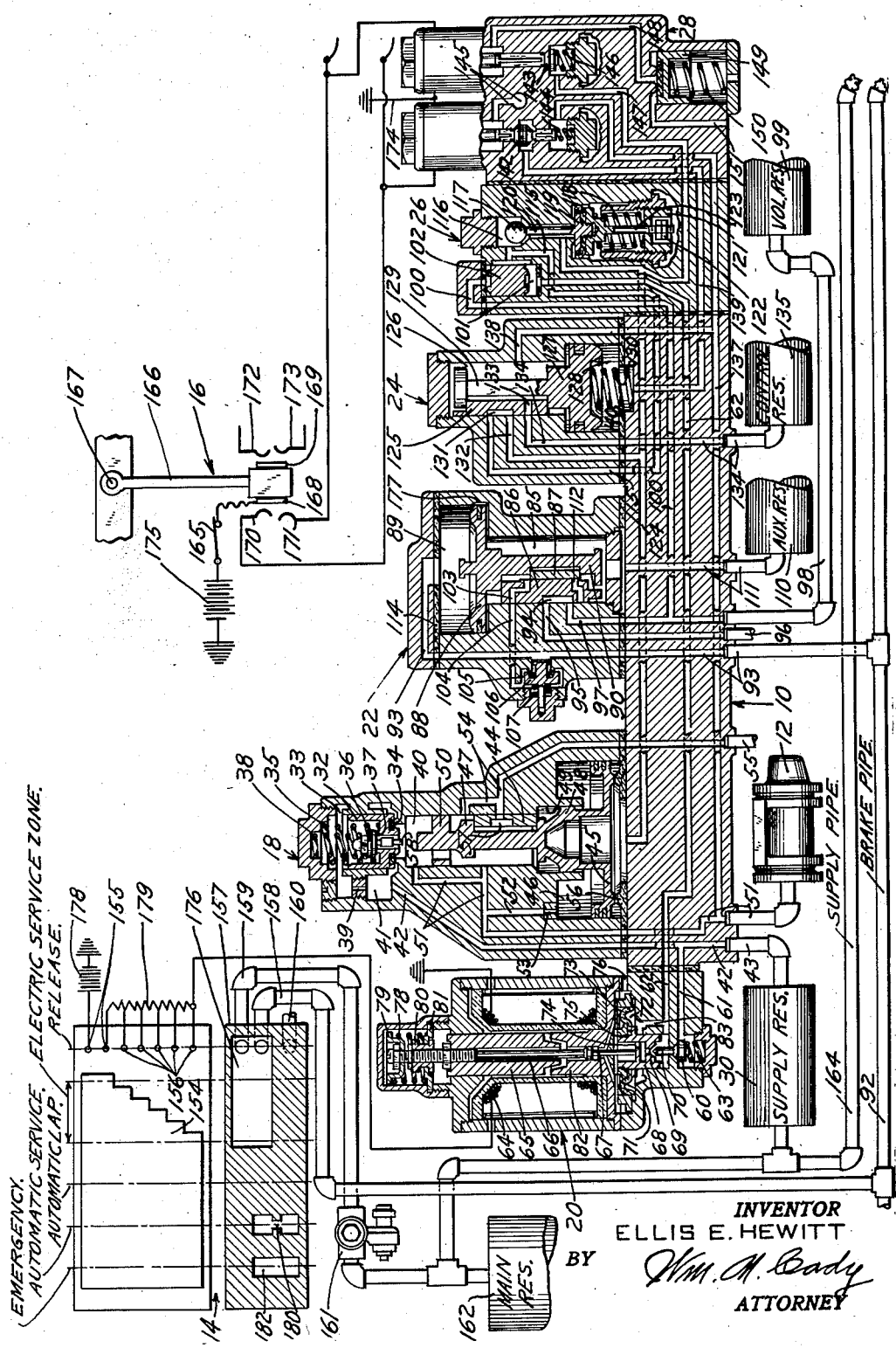
INVENTOR
ELLIS E. HEWITT
BY Wm. A. Cady
ATTORNEY Patented Sept. 22, 1936

2,055,106

UNITED STATES PATENT OFFICE 2,055,106

ELECTROPNEUMATIC BRAKE

Ellis E. Hewitt, Edgewood, Pa., assignor to The Westinghouse Air Brake Company, Wilmerding, Pa., a corporation of Pennsylvania Application October 10, 1934, Serial No. 747,729

17 Claims. (Cl. 303—15)

This invention relates to electropneumatic brakes, and more particularly to electropneumatic brakes for high speed trains.

In trains designed for high speed service safety considerations demand that the braking equipment employed provide for the highest practical degree of reliability. One manner of providing for this reliability in a fluid pressure brake system is to arrange the system such that an application of the brakes may be effected either by straight air operation, by automatic operation, or by a combination of the two. In systems of this character a control valve device is generally provided on each car in the train, and these valve devices are controlled from the head end of the train through some form of controlling brake valve device.

Each control valve device most generally comprises some form of relay valve for controlling all flow to the brake cylinder, and an electrically controlled valve device and an automatic valve device for controlling operation of the relay valve. The electrically controlled valve device controls operation of the relay valve during straight air operation, while the automatic valve device controls operation of the relay valve during automatic operation. In addition to these valve devices, the control valve device usually includes additional electrically actuated valves under the control of a retardation controller device, which valves and retardation controller device function to control the brake cylinder pressure so as to decelerate the train at some predetermined desired rate of retardation. The retardation controller device and electrically actuated valves usually function to first cut off the supply of fluid under pressure to the brake cylinder and subsequently to effect a release of fluid under pressure from the brake cylinder. One of the difficulties heretofore encountered has been that more fluid under pressure has been released from the brake cylinder through this operation than necessary to maintain the desired rate of retardation, with the result that the rate maintained was not maintained constant within tolerable limits. In addition, there has been an undesired cycling operation of the apparatus in alternately supplying fluid under pressure to and releasing it from the brake cylinder, thereby causing unnecessary loss of fluid pressure. It is desirable in practice that the retardation controller device function first to cut off the supply of fluid under pressure to the brake cylinder, and thereafter, as the speed of the train diminishes and the coefficient of friction between the rubbing parts of the brakes increases, to intermittently release fluid under pressure from the brake cylinder without at any time resupplying fluid under pressure thereto.

However, while it is desired that the retardation controller device release from the brake cylinder whatever fluid under pressure is necessary to maintain the desired rate of retardation, an accidental release of total brake cylinder pressure should be guarded against.

In the equipments providing for both straight air and automatic operation as heretofore proposed, the retardation controller device has been effective in controlling only applications effected by straight air operation. It is of course desirable that the retardation controller device be effective in controlling applications by either straight air operation or by automatic operation.

With the above considerations in mind, it is a principal object of the present invention to provide a brake equipment in which applications may be effected either by straight air operation or by automatic operation, and in which a retardation controller device may be employed to control applications by either mode of operation.

Another object of the present invention is to provide means for effecting a more gradual release of the brakes in response to operation of the retardation controller device, so as to prevent the needless loss of fluid under pressure and to maintain a more nearly constant rate of retardation.

A yet further object of the invention is to provide means, in connection with an equipment of this character, which will prevent a total loss of brake cylinder pressure in the event of undesired operation of the electrically actuated valves controlled by the retardation controller device.

Yet further and more specific objects of the invention will appear from the following description, which is taken in connection with the single figure of the attached drawing, which shows in schematic and diagrammatic form one arrangement of apparatus which may be employed in carrying out the invention.

In this drawing, an arrangement for only one car has been shown, but, as will hereinafter more fully appear, portions of the apparatus may be duplicated on other cars in the train, and thus provide for a complete train braking equipment.

In the embodiment illustrated, I have shown a control valve device 10, which operates to control the supply of fluid under pressure to and its release from a brake cylinder 12, whether effected by straight air operation or by automatic operation. One of these control valve devices is located on each car in the train. At the head end of the train, I provide a controlling brake valve device, diagrammatically indicated at 14, and this brake valve device is employed to control operation of all of the control valve devices throughout the train.

In order to limit the rate of retardation produced by an application of the brakes to some predetermined maximum value which will not produce sliding of the wheels, a retardation controller device 16 has been included, and this device functions to control certain electrically operated valve devices, as will more fully appear hereinafter.

Considering now more in detail the control valve device 10, this valve device comprises a relay valve section 18, an electrically controlled self-lapping magnet valve section 20, an automatic valve section 22, a pneumatic cut-off valve section 24, an inshot valve section 26, and a magnet valve section 28.

The relay valve section 18 controls the supply of fluid under pressure from a connected supply reservoir 30 to the connected brake cylinder 12. The flow of fluid from the reservoir to the brake cylinder is controlled by a supply valve 32, which is disposed in a valve chamber 33. The valve 32 is urged toward a seat 34 by a spring 35. Disposed within the supply valve 32 is a pilot valve 36, urged toward a seat 37 by a spring 38.

When the pilot valve 36 is seated, the fluid pressure acting upon the valve 32 from the valve chamber 33, plus the pressure of spring 35, will hold the valve upon its seat 34. When the pilot valve 36 is actuated to unseated position, fluid under pressure in the valve chamber 33 is released past the unseated pilot valve to a slide valve chamber 40 at a rate faster than it can be supplied to the valve chamber 33 through a choke 39 from a supply chamber 41, which is in communication with the supply reservoir 30 by way of passage 42 and pipe 43. As a consequence, the pressure on the upper side of the valve 32 is reduced and the valve can then be unseated by a relatively small pressure from below. When the valve 32 is unseated, fluid under pressure may flow from the supply chamber 41, and the supply reservoir 30, to the slide valve chamber 40.

Disposed in the slide valve chamber 40 is a slide valve 44, and for operating the slide valve and for unseating the pilot valve 36 and the main supply valve 32, there is provided a piston 45 disposed in a piston chamber 46 and having a stem 47. The piston stem 47 is provided with an enlarged flanged portion 48 interfitting with a bore 49, for the purpose of providing a seal between the piston chamber 46 and the slide valve chamber 40 as the piston 45 moves. Also, the stem 47 is provided with a guiding element 50 for guiding movement of the stem when the piston 45 is moved upwardly and downwardly. The slide valve 44 is carried in a recess in the stem 47 and its movement is coextensive with the movement of the piston 45.

The slide valve chamber 40 is in constant communication with the brake cylinder 12 by way of pipe and passage 51, and is also in restricted communication with the piston chamber 46 by way of passage 52, in which is disposed a choke 53.

The slide valve 44 controls communication between the slide valve chamber 40 and the atmosphere, by way of passages 54 and pipe 55.

In release position of the relay valve section 18, which is that shown in the drawing, the piston 45 is in its lowermost position, where an annular flange thereon contacts and seals with a corresponding annular portion of a gasket 56. In this position, the slide valve 44 uncovers one passage 54 and a port 57 therein registers with the other passage 54, so that fluid pressure may be released from the slide valve chamber 40, and the connected brake cylinder 12, to the atmosphere by way of passages 54 and pipe 55.

When the relay piston 45 is actuated upwardly to application position, slide valve 44 blanks both of passages 54, to cut off communication from the slide valve chamber 40 and the brake cylinder 12 to the atmosphere, and thereafter the upper end of the piston stem 47 first engages stem 58 of the pilot valve 36, to partially unload the main supply valve 32, and then engages and unseats the main supply valve. Unseating of this supply valve effects a supply of fluid under pressure to the slide valve chamber 40 and the brake cylinder 12, through the passages heretofore indicated.

Relay piston 45 is actuated to application position by the supply of fluid under pressure to the volume therebelow. When fluid under pressure is thus supplied below the piston it acts initially upon the piston area within the annular flange in engagement with the gasket 56, and as soon as the piston is lifted from the gasket, fluid pressure then acts upon the total piston area and thus causes the piston to move quickly upwardly to application position.

When the supply of fluid under pressure to the volume below the piston has been cut off, the pressure of fluid flowing to the space above the piston, through the choke 53, equalizes with that below, whereupon the piston moves downwardly until the supply valve 32 is seated. The supply of fluid under pressure to the brake cylinder is then lapped.

The supply of fluid under pressure to the volume below relay piston 45 is primarily controlled by the self-lapping magnet valve section 20 during straight air operation, or by the automatic valve section 22 during automatic operation, and secondarily by the inshot valve section 26 and the cut-off valve section 24 during either operation.

The self-lapping magnet valve section 20 is provided with a supply valve 60, which controls the flow of fluid under pressure from the supply reservoir 30 to the volume below relay piston 45, by way of pipe 43, passages 42 and 61, past supply valve 60 when unseated, to passage 62, and from thence through the inshot valve section and the pneumatic cut-off valve section, as will hereinafter be more fully described.

The supply valve 60 is urged toward seated position by a spring 63, and toward unseated position by action of an electromagnet having a winding 64, which when energized actuates members to be described to unseat the valve. When the winding 64 is energized, the magnetic effect produced thereby actuates a movable core member 65 downwardly. Secured to the core member 65 is a stem 66 which engages a pin 67 to actuate a sliding member 68. The sliding member 68 is provided with a valve seat 69 which engages and interfits with the upper end of the stem of the supply valve 60, which end forms a release valve 70, controlling the release of fluid pressure from the volume below relay piston 45.

The sliding member 68 is normally held in an upper or release position by a resilient diaphragm 71, which is secured thereto and to the casing embodying the self-lapping valve device in a manner to form a chamber 72 therebelow and a chamber 73 thereabove. When the sliding member 68 is in its upper or release position, the release valve 70 is unseated, so that fluid pressure is released from the volume below relay piston 45 to the atmosphere, past the unseated release valve, through an orifice 74, passage 75, and port 76.

When the sliding member 68 is actuated downwardly the release valve 70 is seated, to cut off this communication to the atmosphere, and the supply valve 60 is unseated, to effect a supply of fluid under pressure to the under side of the relay piston.

The downward movement of the sliding member 68 is, as aforesaid, caused by downward movement of the core member 65. The downward movement of the core member 65 is opposed by a spring 78 reacting against a spring cup 79 secured to the upper end of stem 66. The downward movement of the core member 65 and the stem 66 is governed or limited by a flanged collar 80, which is adapted to engage a stop washer 81 upon a predetermined downward movement of the core and stem.

As may be seen from the construction shown in the drawing, the spring cup 79 and the flanged collar 80 may be adjusted to different positions on the stem 66. The stem 66 may be also adjusted with respect to the core member 65 by means of the screw-thread connection shown.

The lower end of the core member 65 is preferably of a bevelled configuration, as shown in the drawing, and interfits with a corresponding recessed portion in a stationary core member 82, so as to provide an air gap therebetween of somewhat decreased reluctance. The casing embodying the valve device provides the return path for the magnetic flux established by the energized winding 64.

When the winding 64 is energized, the release valve 70 is first seated and the supply valve 60 in next unseated an amount in accordance with the downward movement of the stem 66 and movable core 65. This movement is opposed by the spring 78 and the unseating of the supply valve 60 is thus determined by the degree of energization of the winding 64.

When the supply valve 60 is unseated fluid under pressure also flows to the chamber 72 below the diaphragm 71, by way of passage 83, and when the fluid pressure acting below the diaphragm overbalances that acting downwardly on the diaphragm due to the magnetic pull on the core member 65, the sliding member 68 is actuated upwardly to permit supply valve 60 to be seated by spring 63. The supply of fluid under pressure to the volume below relay piston 45 will then be lapped.

If the pressure below diaphragm 71 is great enough, release valve 70 may be unseated to release pressure from below the relay piston. If, on the other hand, after supply valve 60 is seated the pressure below the diaphragm should diminish, due to leakage or for other reasons, the diaphragm will be actuated downwardly by the magnetic force above, to unseat the supply valve and thus readmit fluid under pressure to the volume below the relay piston. The self-lapping magnet valve portion thus operates to supply and maintain a pressure to the relay valve section in accordance with the current supplied to the winding 64.

As before indicated, the supply of fluid under pressure to the volume below relay piston 45 may be also controlled by the automatic valve section 22. This section is provided with a slide valve chamber 85 in which is disposed a main slide valve 86 and a graduating valve 87. For operating the main and graduating valves there is provided a piston 88, disposed in a piston chamber 89. The piston 88 is provided with a stem 90 adapted to move the graduating valve 87 coextensive therewith, and to move the main slide valve 86 with a delayed or lost motion.

The piston chamber 89 is in communication with a brake pipe 92 by way of pipe and passage 93. When the pressure in the brake pipe is normal, that is, maintained at a predetermined value, the piston 88 is in its lowermost position, as shown in the drawing, which is also the release position. In this release position, a cavity 94 in the main slide valve 86 connects a passage 95, which leads to the atmosphere by way of pipe 96, with a passage 97, which has two branches, one branch leading by way of pipe 98 to a volume reservoir 99, and the other branch leading by way of passage 100 to a double check valve chamber 101 in which is disposed a double check valve 102.

In release position, the main slide valve 86 also has a port 103 in registration with a passage 104 leading to a valve chamber 105, in which is disposed a fast recharge valve 106, urged toward a seated position by a spring 107. This fast recharge valve 106 controls communication between the passage 104 and the brake pipe passage 93, as will hereinafter be more fully referred to.

The slide valve chamber 85 is connected to an auxiliary reservoir 110 by way of pipe and passage 111. When the pressure in the piston chamber 89 is reduced at a service rate, the overbalancing pressure beneath the piston in the slide valve chamber actuates the piston upwardly to service position. In service position, the main slide valve 86 blanks the two passages 95 and 104, and brings port 112 therein in registration with the passage 97, the graduating valve 87 having uncovered the port 112 at this time. Fluid under pressure then flows from the main slide valve chamber 85, and the auxiliary reservoir 110, to both the volume reservoir 99 and to the double check valve chamber 101, according to the degree of reduction in brake pipe pressure.

The pressure of fluid supplied to the double check valve chamber 101, above the double check valve 102, will actuate the double check valve to lower position, and thereafter fluid under pressure will flow to the volume below relay piston 45, through the inshot valve section, as will more fully appear presently.

When the pressure in piston chamber 89 is reduced at an emergency rate, the piston 88 moves upwardly and seals against gasket 114, and the main slide valve 86 uncovers passage 97 while blanking passages 95 and 104. Fluid under pressure then flows from the slide valve chamber 85, and the auxiliary reservoir 110, to both the volume reservoir 99 and the volume below relay piston 45 until equalization takes place.

As before stated, fluid under pressure supplied to the volume below relay piston 45 by operation of the self-lapping magnet valve section 20 also flows through the inshot valve section 26, flowing first to the double check valve chamber 101, where the pressure of the fluid actuates the double check valve 102 to its upper position. From the double check valve chamber 101, the flow is initially through two branches, one branch being by way of passage 115 and the other branch being by way of a ball valve chamber 116. Disposed in this chamber is a ball valve 117, which is urged toward an unseated position by action of a spring 118 acting upon a piston 119 having a stem 120 engaging the ball valve. An adjusting member 121 is provided for adjusting the tension on the spring 118, and upward movement of the piston 119, and consequently the unseating of the ball valve 117, may be controlled by adjusting nuts 122 threadably disposed on an adjusting stem 123 associated with the piston.

When the ball valve 117 is in unseated position, fluid under pressure may flow from the chamber 116 past the unseated ball valve to a passage 124 leading to the volume below the relay piston 45.

As the pressure of the fluid supplied to the volume below relay piston 45 increases and reaches a predetermined value, it acts upon the upper side of the inshot piston 119 and actuates the piston downwardly against resistance of spring 118, to seat the ball valve 117. After the ball valve is seated, the flow of fluid to the volume below relay piston 45 takes place only through the passage 115, which leads through the pneumatic cut-off valve section 24.

The pneumatic cut-off valve section 24 is provided with a slide valve 125, disposed in a slide valve chamber 126, and a piston 127 disposed in a piston chamber 128. The piston 127 has a stem 129 adapted to actuate the slide valve 125 coextensive with movement of the piston 127. A spring 130 urges the piston 127 upwardly to a normal or biased position. In this position a cavity 131 in the slide valve 125 connects the aforementioned passage 115 with a passage 132 joining with the passage 124 leading to the volume below relay piston 45.

At the same time, a port 133 in the slide valve 125 is in registration with a passage 134 leading to a control reservoir 135, so that the slide valve chamber 126 is connected to this control reservoir. The slide valve chamber 126 is in constant communication with the brake cylinder 12 by way of passages 137 and 138, and hence when the piston 127 is in its upper position, the control reservoir 135 and brake cylinder 12 are connected.

The piston chamber 128 is at times also in communication with the brake cylinder 12, through a passage 139 which runs through the magnet valve section 28 to connect with the aforementioned passage 137 leading to the brake cylinder. When the pressure in the piston chamber 128 substantially equals the pressure in the slide valve chamber 126, the piston 127 will remain in its upper position. When the pressure in the piston chamber 128 is reduced below that in chamber 126, the overbalancing pressure in the chamber 126 actuates the piston downwardly to where it engages gasket 140. In this position of the piston 127, the slide valve 125 blanks passage 115 and connects passage 132 to passage 134, for a purpose which will appear later.

The pressure in the piston chamber 128 is controlled by the magnet valve section 28. This valve section comprises a double beat valve 142, which controls the supply of fluid under pressure to and its release from the aforementioned piston chamber 128, and a release valve 143, which controls the release of fluid pressure from the volume below relay piston 45. These two valves are under the control of the retardation controller device 16.

The double beat valve 142 is urged toward an upper seated position by a spring 144, and is urged toward a lower seated position by an electromagnet in the upper part of the casing, which when energized actuates the valve downwardly. When in upper seated position, the double beat valve 142 opens communication between the piston chamber 128 and the brake cylinder 12, and when in lower seated position this communication is cut off and the pressure in the piston chamber 128 is released to the atmosphere through an exhaust port and passage 145.

The release valve 143 is urged toward seated position by a spring 146 and toward unseated position by action of another electromagnet in the upper part of the casing, which when energized actuates the valve downwardly. In unseated position, this valve opens a communication between a passage 147, leading to the volume below the relay piston 45, and a passage 148 leading to the seat of a limiting valve 149.

As shown, the limiting valve 149 is urged toward its seat by a spring 150, and is adapted to be actuated to unseated position by a chosen pressure in the passage 148. In unseated position, the valve 149 permits the release of fluid pressure from passage 148 and the volume below relay piston 45 to the atmosphere, by way of an exhaust passage 151.

The brake valve device 14, which controls the major operations of the control valve device 10, may be one of a large number of types and in the type illustrated comprises a drum controller portion having a drum 154, adapted to engage and connect together a pair of contact fingers 155 and to thereafter sequentially engage a plurality of contact fingers 156, to electropneumatically control brake applications by straight air operation.

The brake valve device also includes a valve portion for effecting and controlling applications by automatic operation. This portion is preferably provided with a rotary valve diagrammatically shown at 157, which is adapted to control communication between a branch pipe 158, connecting with the brake pipe 92, and a feed valve pipe 159, and with an exhaust pipe 160 leading to the atmosphere.

The feed valve pipe 159 connects with a feed valve device 161, which in turn is connected to a source of fluid under pressure, as for example a main reservoir 162. The feed valve device 161 may be of one of a large number of types, and as is well known in the art, is provided for the purpose of maintaining a substantially uniform pressure of the fluid supplied from the main reservoir 162.

The drum controller and rotary valve portions are preferably combined in a manner such that both may be operated by manipulation of a single control element, as for example the familiar brake valve handle. This control element, or handle, is movable to different positions, as indicated in the diagrammatic representation shown in the drawing, and as will hereinafter be referred to.

In order that the supply reservoirs 30 throughout the train shall be charged at all times, a supply pipe 164 is provided which extends throughout the train. Each of the supply reservoirs 30 is then connected to this pipe, so that the supply reservoirs are at all times charged to main reservoir pressure.

The retardation controller device 16 may also be of one of a large number of types and for that reason I have shown in more or less diagrammatic form a pendulum type which may be employed. In this type a pendulum 166 is freely suspended from a frictionless pivot 167 and carries therewith and insulated therefrom contacts 168 and 169.

The retardation controller device is positioned on the vehicle so that the pendulum 166 is swung to the right or left according to the rate of speed change of the vehicle. As the pendulum 166 swings to the left, its contact 168 will first engage a stationary and resiliently supported contact 170, and thereafter another and similar stationary contact 171. As the pendulum swings to the right, it engages in a similar manner similar stationary contacts 172 and 173.

Considering first the contacts to the left, the contact 170 is connected to the electromagnet in the magnet valve section 28 controlling the double beat valve 142, and the contact 171 is connected to the electromagnet controlling the release valve 143. The other terminal of each of these electromagnets is connected to a ground connection 174. The movable contact 168 of the retardation controller device is connected to one terminal of a battery 175, and the other terminal of the battery is also connected to a ground connection, so that as the movable contact 168 engages the stationary contacts 170 and 171 the electromagnets in the magnet valve section 28 will be energized.

Now if when the train is decelerating the pendulum 166 swings to the left, it will be obvious that contacts 168 and 170 will be brought into engagement at one rate of retardation, and that contacts 168 and 171 will be brought into engagement at a higher rate of retardation. The double beat valve 142 will then be actuated downwardly when the first two of these contacts engage, and the release valve 143 will be unseated when the second of these contacts engage. When it is desired that the same result be accomplished for either direction of swing of the pendulum 166, then contact 172 is connected to contact 170, contact 173 is connected to contact 171, and contact 169 is connected to contact 168.

If however it is desired that contacts 172 and 173 be employed in connection with controlling the acceleration of the train, then these contacts may be connected to an acceleration control apparatus, as described and claimed in the copending application of Clyde C. Farmer, Serial No. 707,918, filed January 23, 1934.

The operation of this embodiment of my invention is as follows:

Running condition

When the train is running, the brake valve device 14 at the head end of the train is maintained in "Release" position, in which the active parts of the brake valve device are in the position shown in the drawing. As will be observed, in this position the drum 154 is out of engagement with the contact fingers, and the rotary valve 157 connects the feed valve pipe 159 with the brake pipe branch pipe 158, by way of port 176.

The brake pipe pressure is thus maintained uniform by the feed valve device 161, and each auxiliary reservoir 110 is charged from the brake pipe 92 by way of charging groove 177 in the automatic valve section 22. With the brake pipe pressure maintained at normal, each automatic valve piston 88 will be in its lower position, as shown.

At the same time, in each self-lapping magnet valve section 20, the supply valve 60 will be seated and the release valve 70 unseated, so that the volume below the relay piston 45 will be in communication with the atmosphere and the relay piston will be in its lowermost or release position.

The other parts of the apparatus shown will be substantially in the positions indicated.

Service application

When it is desired to effect a service application of the brakes, the brake valve device is operated through the zone indicated as "Electric service zone." When the drum 154 thus engages and connects together the fingers 155, current will be supplied from a battery 178 to each self-lapping magnet valve winding 64, through a resistance 179. As the drum 154 rotates, it sequentially engages the contact fingers 156 to progressively cut out portions of the resistance 179, and thereby energize each winding 64 according to operation of the brake valve device through the "Electric service zone."

In each control valve device, with the winding 64 energized, the core member 65 is actuated downwardly to first effect seating of release valve 70 and subsequently unseating of the supply valve 60. Fluid under pressure then flows from the supply reservoir 30 to the volume below relay piston 45, through a communication including pipe 43, passages 42 and 61, past the unseated supply valve 60, passage 62, double check valve chamber 101 (where double check valve 102 is actuated to upper position), and from thence to the volume below relay piston 45 by way of two paths. The first of these two paths includes passage 115, slide valve cavity 131, and passages 132 and 124. The second of these paths includes ball valve chamber 116, past unseated ball valve 117, and passage 124.

Fluid pressure beneath the relay piston 45 actuates the piston and slide valve 44 upwardly to cut off the communication between the slide valve chamber 40 and the atmosphere, and to effect unseating of the main supply valve 32. Fluid under pressure then flows from the supply reservoir 30 to the slide valve chamber 40 and from thence to the brake cylinder 12.

As the pressure on the under side of relay piston 45 builds up, a value will be reached at which the inshot piston 119 will be actuated downwardly far enough to seat the ball valve 117. Thereafter the flow of fluid to the under side of the relay piston will be by way of the other path only. The pressure at which the ball valve 117 closes is selected as that corresponding to a brake cylinder pressure which will insure that the train will be brought to a stop in case the path leading through the cut-off valve section 24 should be closed. This brake cylinder pressure is preferably well below that generally obtaining in normal full service applications, in which the retardation controller device is effective.

The supply of fluid under pressure to the relay valve section will be lapped by the self-lapping valve section when the pressure reaches a value corresponding to the brake valve movement, and when the supply thereto has been lapped, the relay piston 45 will move to lap position.

In the train, each self-lapping section 20 of each control valve device will operate independently of every other self-lapping section, so that the brake cylinder pressures effected will be substantially uniform throughout the train, and according to the position of the brake valve handle, regardless of differences in piston travel, leakage, etc.

When fluid under pressure is supplied to the brake cylinder 12, it also flows to the piston chamber 128 in the pneumatic cut-off valve section 24, by way of passage 137, past the unseated double beat valve 142, and through passage 139, and to slide valve chamber 126, by way of passages 137 and 138.

As pressure builds up in the brake cylinders, the train begins to decelerate. If the rate of retardation produced by application of the brakes is sufficient to cause the pendulum 166, of the retardation controller device 16, to swing far enough to the left to cause engagement of contact 168 with contact 170, then each electromagnet controlling a double beat valve 142 will be energized, and the double beat valve will be actuated to lower seated position, to cut off communication between the brake cylinder 12 and the piston chamber 128 in each pneumatic cut-off valve section 24. At the same time, the double beat valve opens communication between the piston chamber 128 and the atmosphere, through the exhaust port passage 145.

As the pressure in piston chamber 128 reduces, the overbalancing pressure above the piston actuates it downwardly, and cavity 131 in slide valve 125 connects the two passages 132 and 134. Connection of these two passages brings into communication the volume below relay piston 45 and the control reservoir 135. The control reservoir 135 is at this time substantially at the same pressure as the volume below relay piston 45, because as fluid is supplied to the brake cylinder 12 it also flows to this reservoir, through passages 137 and 138, slide valve chamber 126, port 133, and pipe and passage 134.

If now the rate of retardation is great enough to cause engagement of contact 168 with contact 171, each electromagnet controlling a release valve 143 will be energized, and the release valve will be unseated. Unseating of this release valve releases fluid under pressure from the volume below relay piston 45, and from the now connected control reservoir 135, to the atmosphere, through passages 148 and 151, the limiting valve 149 being unseated by the pressure in the passage 148.

Since the control reservoir 135 is connected to the volume below the relay piston 45, the effect of this release of pressure upon the operation of the relay valve section 18 is more gradual than were the additional volume of the control reservoir not present. As a result, the relay valve section functions to release pressure from the brake cylinder more gradually, because the piston 45 moves slowly downwardly to only partially, or crack, open the exhaust passages 54.

As the rate of retardation diminishes due to this release of pressure from the brake cylinders, the pendulum 166 swings back to the right until contact 168 disengages from contact 171. Each release valve 143 will then be seated and the parts of each control valve device will again assume lap position, with the cut-off valve piston 127 remaining in lower position.

As the speed of the vehicle diminishes, the coefficient of friction between the rubbing parts of the brakes increases, so that the rate of retardation tends to increase. When this takes place, the pendulum 166 will again swing to the left to effect a further release of fluid pressure from the brake cylinders. Since for each release effected by the retardation controller device, the volume of the control reservoir 135 is added to the volume below the relay piston 45, the variations in the rate of retardation of the train will be small and a more uniform rate of retardation will be maintained.

If when the retardation controller contact 168 disengages from the contact 171, the release valve 143 should fail to be seated, then a total release of the brakes would result were it not for the limiting valve 149. When the pressure acting on valve 149 from passage 148 falls below a predetermined value, corresponding to the upward force exerted by spring 150, the limiting valve 149 will be seated, and sufficient pressure is thereby maintained in the volume below relay piston 45 to insure that the train will be brought to a stop.

When it is desired to effect a release of the brakes following a service application, the brake valve device is operated to "Release" position, whereupon the self-lapping magnet valve winding 64 is deenergized and a total release of fluid pressure from the brake cylinder is effected.

If at the time the brake valve handle is moved to release position, the pneumatic cut-off valve piston 127 should be in its lowermost position, the operator may open switch 165 in the circuit to the retardation controller device and full control of the brakes will then be transferred to the brake valve device 14.

*Auxiliary service application*

In case of failure of the electropneumatic control in effecting an application by straight air operation, a service application by automatic operation may be effected by movement of the brake valve handle to "Automatic service" position. In this position, rotary valve 157 disconnects the brake pipe from the feed valve device 161, and connects the brake pipe to the atmosphere through a port having a restriction 180 therein. The brake pipe is thus vented to the atmosphere at a service rate.

As before explained, a service rate of brake pipe reduction causes the automatic valve piston 88 in each control valve device to move to service position, to effect a supply of fluid under pressure from the connected auxiliary reservoir 110 to the volume below relay piston 45, in accordance with the degree of brake pipe reduction. The flow from the auxiliary reservoir 110 is through pipe and passage 111, slide valve chamber 85, slide valve port 112, and from thence to both the volume reservoir 99 and the double check valve chamber 101. From the double check valve chamber 101, the flow is to the under side of relay piston 45 through the same passages as previously described for a straight air service application.

After a predetermined pressure has been established in the volume below the relay piston 45, the inshot valve piston 119 operates as before to seat the ball valve 117.

The volume reservoir 99 is provided to permit a more flexible control of the pressure of fluid supplied to the volume below relay piston 45 through operation of the automatic valve section 22. If the volume reservoir 99 were not provided, the pressure effected below relay piston 45 would bear a relation to brake pipe pressure reduction much higher than in present standard equipments, and light applications of the brakes could not be effected. By introducing additional volume a given reduction in brake pipe pressure will effect a pressure below relay piston 45 more nearly in accordance with the ratio in standard automatic brake systems.

Now since the flow of fluid under pressure to the under side of relay piston 45 passes through the pneumatic cut-off valve section 24 for either straight air operation or automatic operation, it follows that the retardation controller device 16 will function to control brake cylinder pressure for both modes of operation, and as described in connection with service applications by straight air operation. Therefore, if the rate of retardation during automatic operation becomes great enough, the retardation controller device 16 will take control to limit the rate as already described.

When it is desired to effect a release of the brakes following an automatic application, the brake valve handle is moved to "Release" position, where the brake pipe is again connected to the feed valve device and brake pipe pressure restored. The automatic valve piston 88 is then actuated to lower position and slide valve cavity 94 connects the volume below relay piston 45 and volume reservoir 99 to passage 95 and pipe 96 leading to the atmosphere.

At the same time, port 103 in slide valve 86 registers with passage 104, so that the now higher brake pipe pressure unseats the fast recharge valve 106, and fluid under pressure flows past this unseated valve through passage 104 and port 103 to slide valve chamber 85, from whence it flows to the auxiliary reservoir 110. The auxiliary reservoir is thus recharged at a rapid rate, and when the pressure in the reservoir reaches a predetermined value, the fast recharge valve 106 seats, and further charging of the auxiliary reservoir takes place through the charging groove 177.

Emergency application

When it is desired to effect an emergency application of the brakes, the brake valve handle is moved to the position indicated as "Emergency". In this position, full strength current will be supplied to each self-lapping magnet valve winding 64, and the brake pipe will be vented to the atmosphere through an unrestricted port 182 in the rotary valve 176.

Each self-lapping magnet valve device will operate to supply fluid under pressure to the under side of each relay piston 45 to a maximum degree. At the same time, the emergency reduction in brake pipe pressure will cause each automatic valve piston 88 to move to emergency position, to also supply fluid under pressure from each auxiliary reservoir 110 to the under side of each relay piston 45 to a maximum degree. Since the flow from the self-lapping valve section and from the automatic valve section are both to the double check valve chamber 101, it will be obvious that only the supply which dominates in pressure will reach the relay valve section.

Thus during an emergency application, a double supply of fluid under pressure to operate each relay valve section is available, thereby ensuring that fluid under pressure will be supplied to the brake cylinders to a maximum degree. It will be noted however, that in both straight air and automatic applications fluid under pressure is supplied to the brake cylinders from the supply reservoirs 30 only.

During an emergency application, each inshot valve section will function as heretofore described, and likewise, the retardation controller device 16 will also function to limit the maximum rate of retardation.

When it is desired to effect a release of the brakes following an emergency application, the brake valve device is moved to "Release" position, where, as before described, each winding 64 is deenergized and each automatic valve piston 88 is actuated to lower position.

While the operation of the embodiment illustrated has been described in connection with operation from one end only, it will be quite apparent that another brake valve device 14 may be provided at the rear end of the train and similar connections made as for the brake valve device at the head end of the train, so that if it is desired to operate the train in either direction, control from either end may be effected.

While I have illustrated and described one particular embodiment of my invention, it will be quite apparent to those skilled in the art that many changes therein and modifications thereof may be made, and I do not wish to be limited to the specific embodiment shown, or otherwise than by the spirit and scope of the appended claims.

Having now described my invention, what I claim as new and desire to secure by Letters Patent, is:

1. In a vehicle or train braking system, the combination with a brake cylinder and a reservoir, of a valve device operated upon an increase in pressure for effecting a supply of fluid under pressure from said reservoir to said brake cylinder, an electrically operated valve device for controlling a communication through which fluid under pressure is supplied to operate said first valve device, an automatic valve device for controlling a second communication through which fluid under pressure is also supplied to effect operation of said first valve device, a fluid pressure operated cut-off valve device for controlling the supply of fluid under pressure through both of said communications, a retardation controller device, and means controlled by said retardation controller device for controlling said cut-off valve device.

2. In a train braking system, the combination with a brake cylinder, of a pressure operated valve device for controlling the supply of fluid under pressure to said brake cylinder, a reservoir, means establishing a communication having parallel branch paths between said reservoir and said pressure operated valve device, an electrically controlled valve device for controlling the supply of fluid under pressure through said communication, a valve device in one of said branch paths operated upon a predetermined pressure for closing said path, and a second valve device in said other branch path operable by brake cylinder pressure for closing said other branch path.

3. In a vehicle brake system, the combination with a brake cylinder, of a pressure operated valve device for controlling the supply of fluid under pressure to said brake cylinder, means establishing a communication having parallel branch paths to said pressure operated valve device, an electrically controlled valve device for controlling the supply of fluid under pressure through said communication, a normally open valve device in one of said paths and operated at a predetermined pressure to close said path, a reservoir, and a second valve device in the other of said branch paths and operable to close said path and to connect said reservoir to said pressure operated valve device.

4. In a train brake system, the combination with a brake cylinder, of a relay valve device for controlling the supply of fluid under pressure to and its release from said brake cylinder, means for effecting a supply of fluid under pressure to said relay device to effect operation thereof, an electrically operated release valve device operable to effect a release of fluid pressure from said relay valve device, a control reservoir, and means normally isolating said reservoir and operable to connect said reservoir to said relay valve device before said release valve device is operated to release fluid pressure therefrom.

5. In a train brake system, in combination, a brake cylinder, a valve device operated by the supply of fluid under pressure thereto for controlling the supply of fluid under pressure to and its release from said brake cylinder, means for establishing a communication through which fluid under pressure is supplied to operate said valve device, a second valve device controlling said communication, said second valve device having a piston subject on both sides to brake cylinder pressure, an electrically operated valve device for reducing the pressure on one side of said piston, and a retardation controller device for controlling said electrically operated valve device.

6. In a train brake system, in combination, a brake cylinder, a relay valve device operated according to the supply of fluid under pressure thereto for controlling the supply of fluid under pressure to and its release from said brake cylinder, means for establishing a communication through which fluid under pressure is supplied to operate said relay valve device, a cut-off valve device having a piston normally subject on both sides to brake cylinder pressure and operable when the pressure on one side of said piston is reduced to close said communication, an electrically operated valve device operable to reduce the pressure on one side of said piston, an electrically operated release valve device operable to diminish the pressure of fluid supplied to operate said relay valve device, and a retardation controller device for controlling operation of said electrically operated valve device.

7. In a train brake system, in combination, a brake cylinder, a relay valve device operated according to the supply of fluid under pressure thereto for controlling the supply of fluid under pressure to and its release from said brake cylinder, means for establishing a communication through which fluid under pressure is supplied to operate said relay valve device, a reservoir, a second valve device controlling said communication to said relay valve device and having a piston normally subject on both sides to brake cylinder pressure, a magnet valve device operable when energized to reduce the pressure on one side of said piston, said second valve device being operable thereupon to cut off said communication to said relay valve device and to connect said reservoir to said relay valve device, and a retardation controller device for controlling said magnet valve device.

8. In a train brake system, in combination, a brake cylinder, a relay valve device operated according to the supply of fluid under pressure thereto for controlling the supply of fluid under pressure to and its release from said brake cylinder, means for effecting a supply of fluid under pressure to said relay valve device, a release valve device operable to release fluid pressure from said relay valve device, a control reservoir normally charged to brake cylinder pressure, a retardation controller device for controlling said release valve device, and means controlled by said retardation controller device for connecting said control reservoir to said relay valve device before said release magnet valve device is operated to release fluid pressure from said relay valve device.

9. In a train brake system, in combination, a brake cylinder, a relay valve device for controlling the supply of fluid under pressure to and its release from said brake cylinder, means for effecting a supply of fluid under pressure to operate said relay valve device, a valve device having a piston normally subject on both sides to brake cylinder pressure for controlling said last supply, electroresponsive means for diminishing the pressure on one side of said piston to cause said valve device to cut off said supply, a second electroresponsive means operable to reduce the pressure of said supply to said relay valve device, a retardation controller device controlling said two electroresponsive means, and a limiting valve device operable to limit said reduction of pressure.

10. In a train brake system, the combination with a brake cylinder, of a relay valve device having a piston operated upon an increase of pressure on one side thereof to effect a supply of fluid under pressure to said brake cylinder and operated upon a reduction in pressure on said side for effecting a release of pressure from said brake cylinder, means for effecting a supply of fluid under pressure to one side of said piston, means for reducing the pressure of fluid supplied to said side of said piston, a reservoir normally charged to brake cylinder pressure, and means operable to connect said reservoir to said side of said piston when said releasing means is operated to reduce the pressure on that side.

11. In a train brake system, the combination with a brake cylinder, of a relay valve device controlling the supply of fluid under pressure to and its release from said brake cylinder, said relay valve device being operated upon a supply of fluid under pressure thereto to effect a supply of fluid under pressure to said brake cylinder and being operated upon a reduction of the pressure of the supply to effect a release of pressure from said brake cylinder, a retardation controller device, means operated by said retardation controller device at one rate of retardation for reducing the pressure of fluid supplied to said relay valve device, and means operated by said retardation controller device at a lower rate of retardation for controlling the rate at which pressure is reduced in said relay valve device.

12. In a train brake system, the combination with a brake cylinder, of a relay valve device operable to control supply of fluid under pressure to and its release from said brake cylinder, said relay valve device being operated upon a supply of fluid under pressure thereto to effect a supply of fluid under pressure to said brake cylinder and operated upon a reduction in the pressure of fluid supplied thereto for effecting a release of pressure from said brake cylinder, a reservoir normally charged to brake cylinder pressure, a retardation controller device having two normally open contacts, means operated upon closing of one of said contacts for cutting off the supply to said relay valve device and for connecting said reservoir thereto, and means operated upon closing of said other contact for reducing the pressure of fluid supplied to said relay valve device.

13. In a train braking system, in combination, a brake cylinder, a relay valve device controlling the supply of fluid under pressure to and its release from said brake cylinder, means for establishing a communication having parallel branch paths through which fluid under pressure is supplied to operate said relay valve device, an inshot valve device controlling one of said branch paths and operated upon a predetermined pressure to close said path, a cut-off valve device having a piston normally subject on both sides to equalized pressures and operated upon a reduction in pressure on one side for closing said other branch path, a selective valve device controlling the supply of fluid under pressure through said communication, said selective valve device having a chamber to which fluid under pressure may be supplied from a plurality of sources, means for electro-pneumatically effecting a supply of fluid under pressure to said chamber, a brake pipe, means operated upon a reduction in brake pipe pressure for effecting a supply of fluid under pressure to said chamber, and a brake valve device operable to control said electropneumatic means and operable to effect reductions in brake pipe pressure.

14. A control valve device having an electrically controlled self-lapping section, a relay valve section, an automatic valve section, an inshot valve section and a fluid pressure operated cut-off valve section, said relay valve section being operable to control a flow of fluid under pressure supplied to effect an application of the brakes, said self-lapping and automatic valve sections being operable to control a communication having branch paths leading from said two sections to said relay valve section, said inshot valve section being operable to control one of said branch paths, and said fluid pressure operated cut-off valve section being operable to control the other of said branch paths.

15. A control valve device having an electrically controlled self-lapping section, a relay valve section, a triple valve section, an inshot valve section, a fluid pressure operated cut-off valve section, and a double check valve, said relay valve section being operable to control the flow of fluid under pressure supplied to effect an application of the brakes, said self-lapping and triple valve sections being operable to effect separably or concurrently a different supply of fluid under pressure to said relay valve section through a communication having parallel branch paths, said double check valve being operable to select between said two supplies, said inshot valve section controlling one of said branch paths, and said fluid pressure operated cut-off valve section controlling the other of said branch paths.

16. A control valve device having an electrically controlled self-lapping section, a relay valve section, an automatic valve section, an inshot valve section, a cut-off valve section, a magnet valve section, and a limiting valve, said control valve device having a communication with two branch paths leading from said self-lapping and automatic valve sections to said relay valve section, said inshot valve section controlling one of said branch paths and said cut-off valve section controlling the other of said branch paths, said magnet valve section controlling operation of said cut-off valve section and being also operable to release fluid pressure from said relay valve section, and said limiting valve being operable to prevent release of pressure from said relay valve section by said magnet valve section below a predetermined value.

17. In a vehicle brake system, in combination, a brake cylinder, means for effecting a supply of fluid under pressure to said brake cylinder, means operated according to the rate of retardation of the vehicle, and means responsive to operation of said last means at a chosen rate of retardation for effecting a release of fluid under pressure from said brake cylinder and for controlling the rate of release according to the existing brake cylinder pressure.

ELLIS E. HEWITT.